Patented July 24, 1934

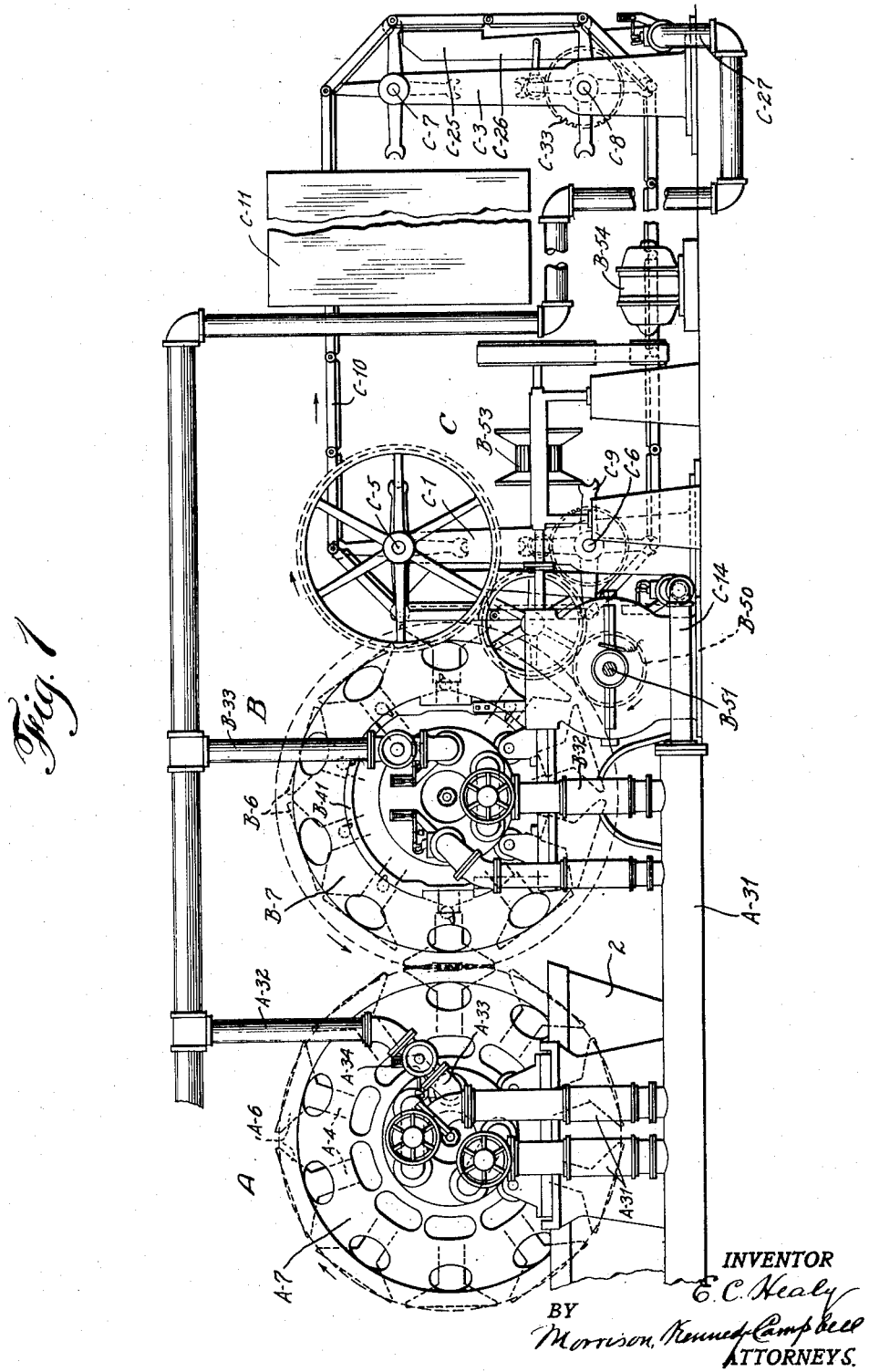

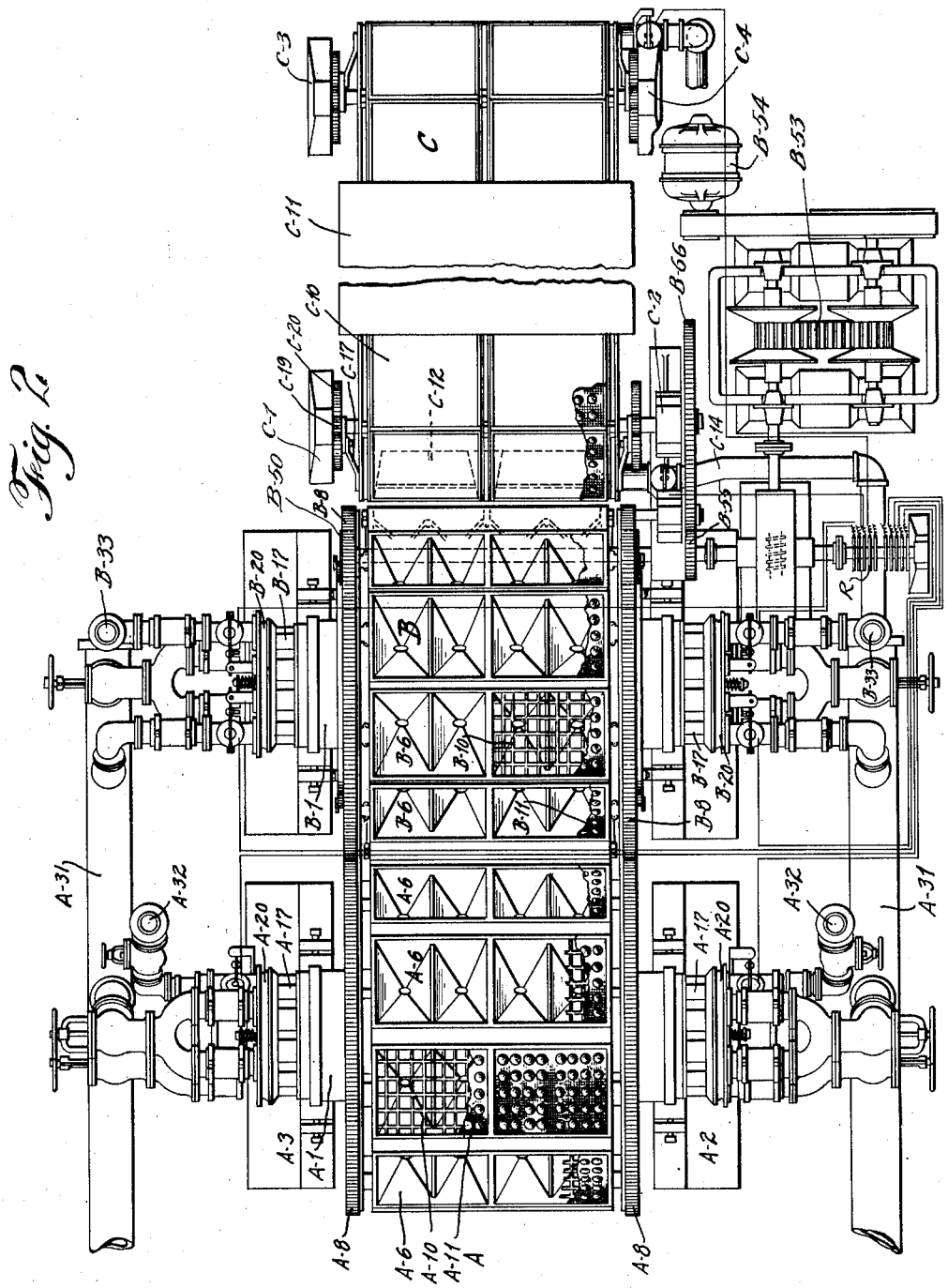

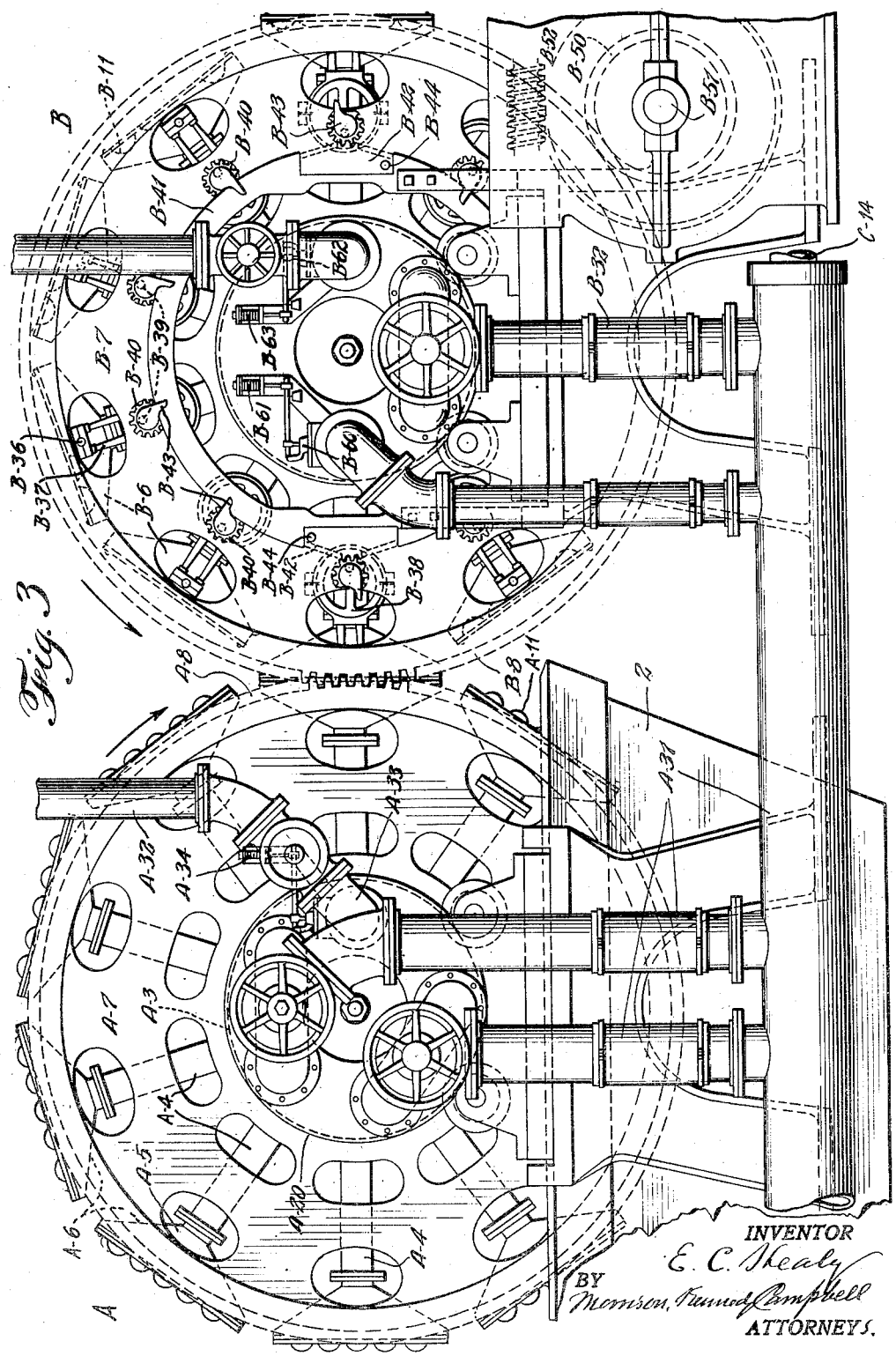

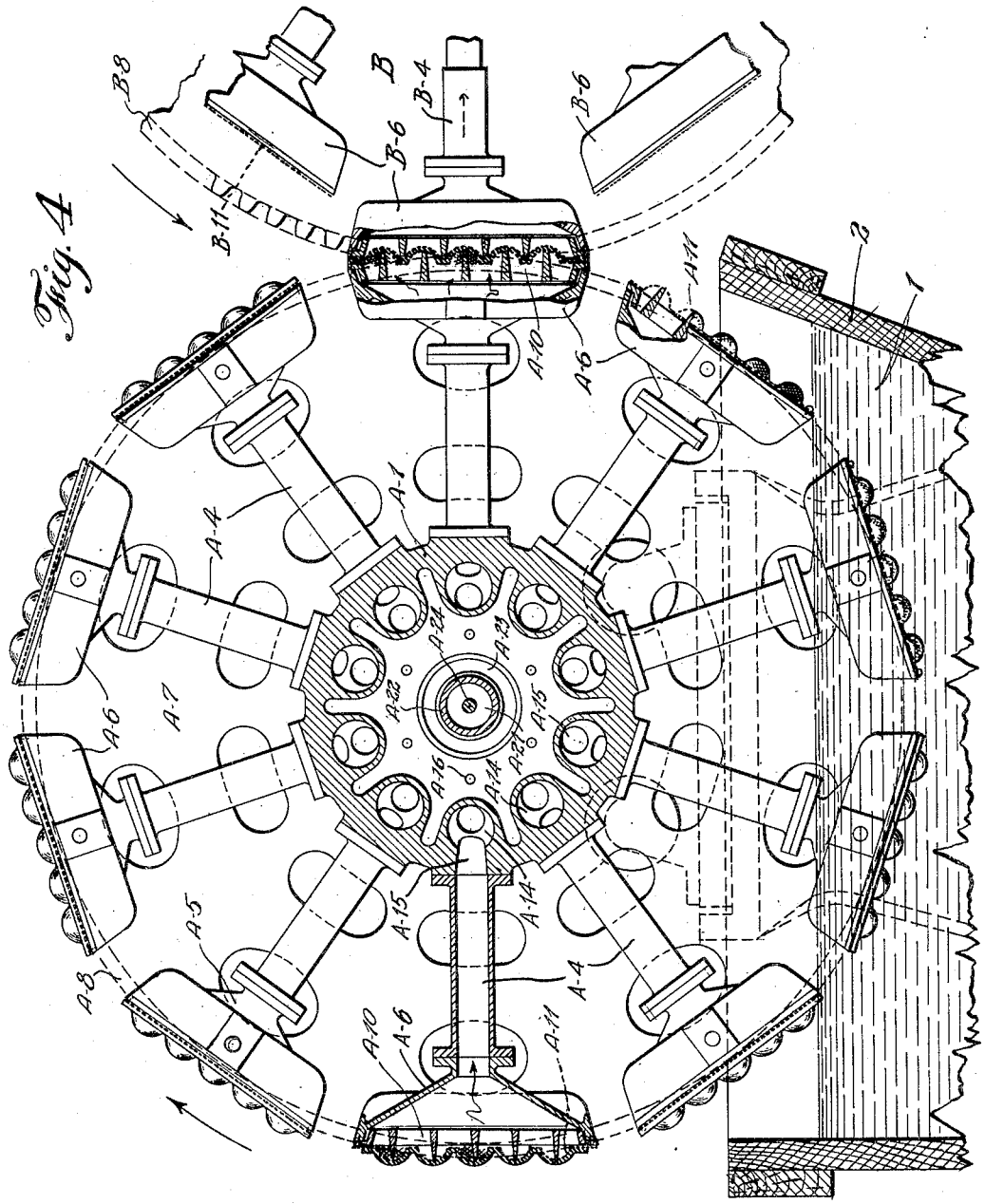

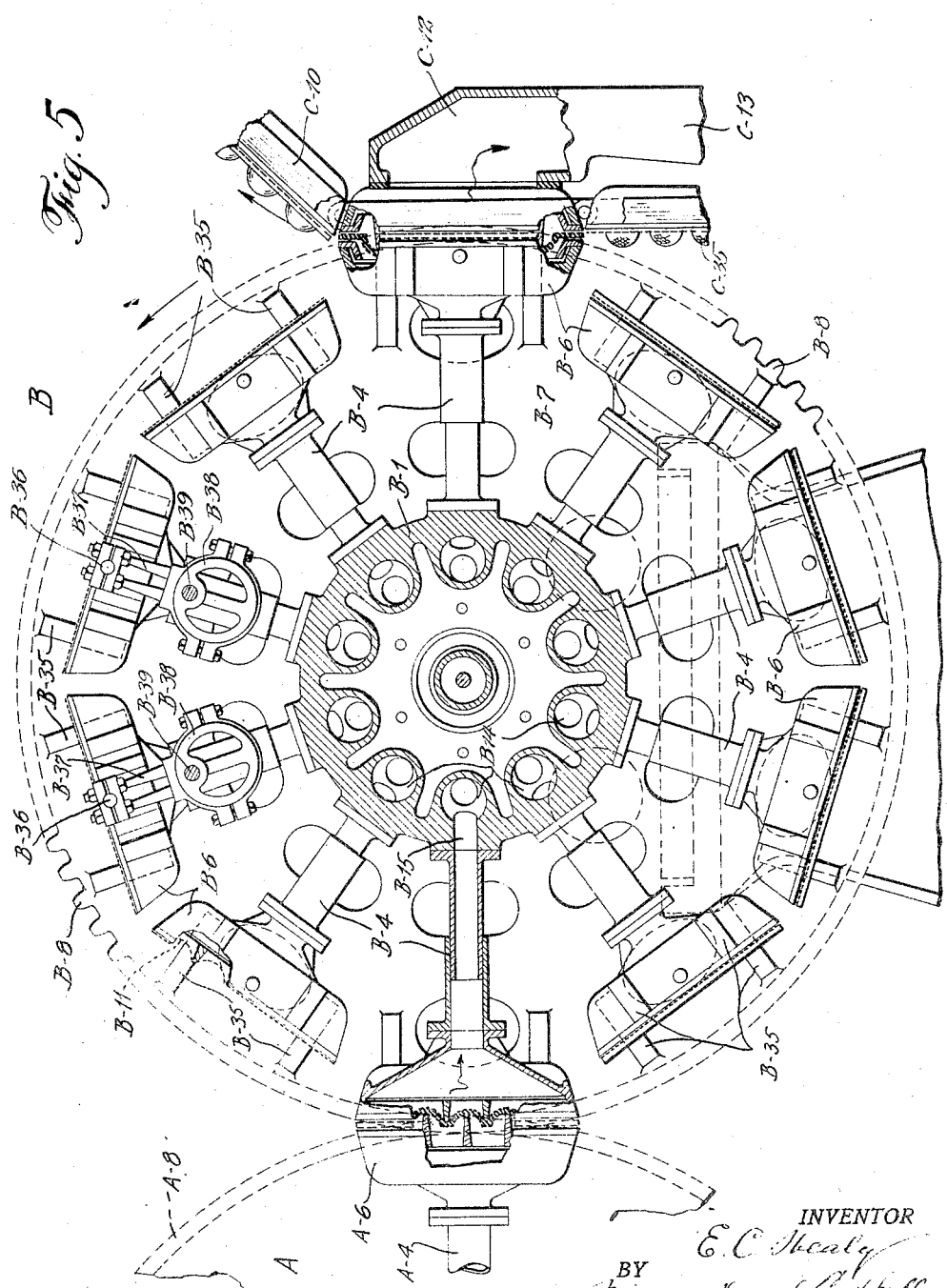

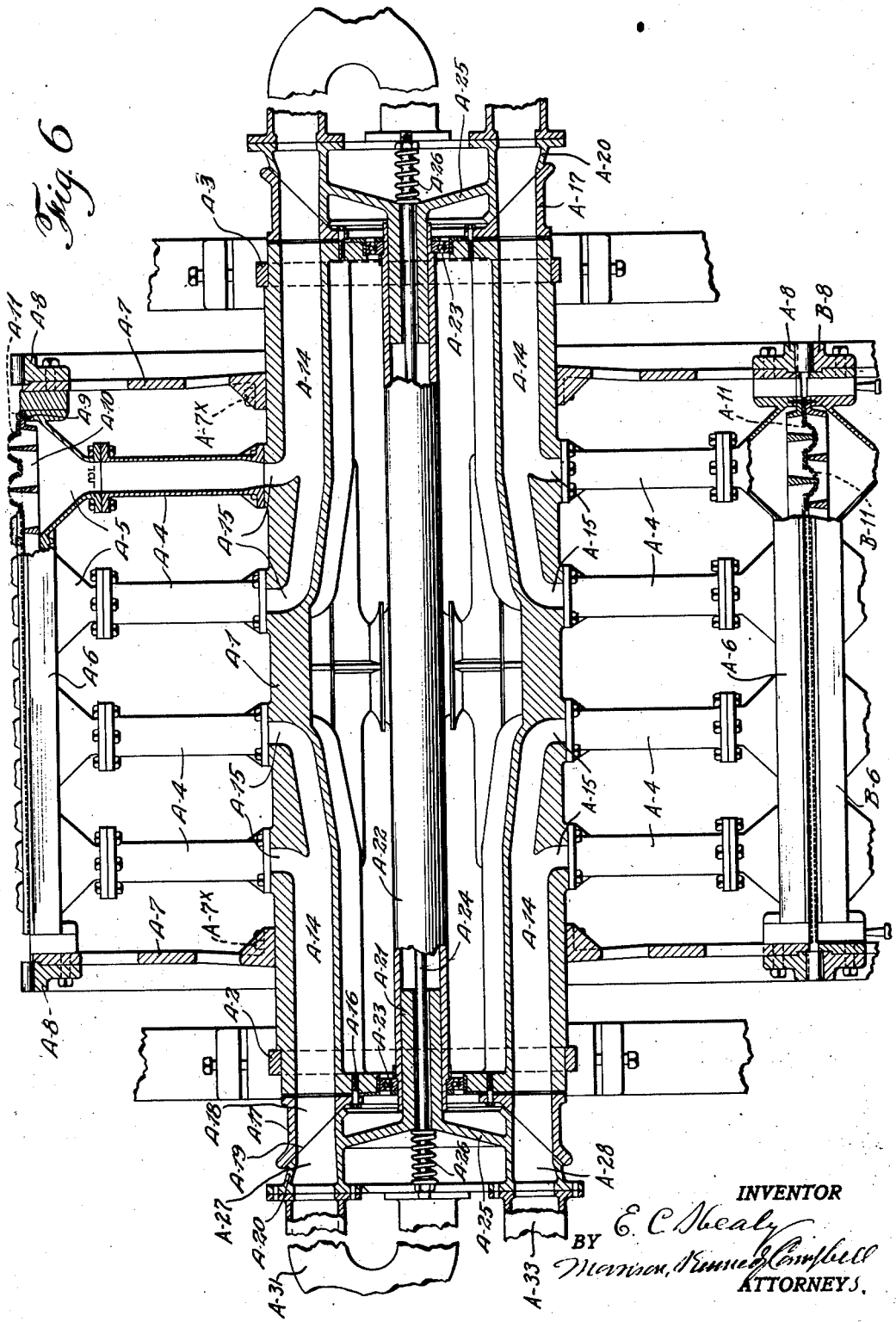

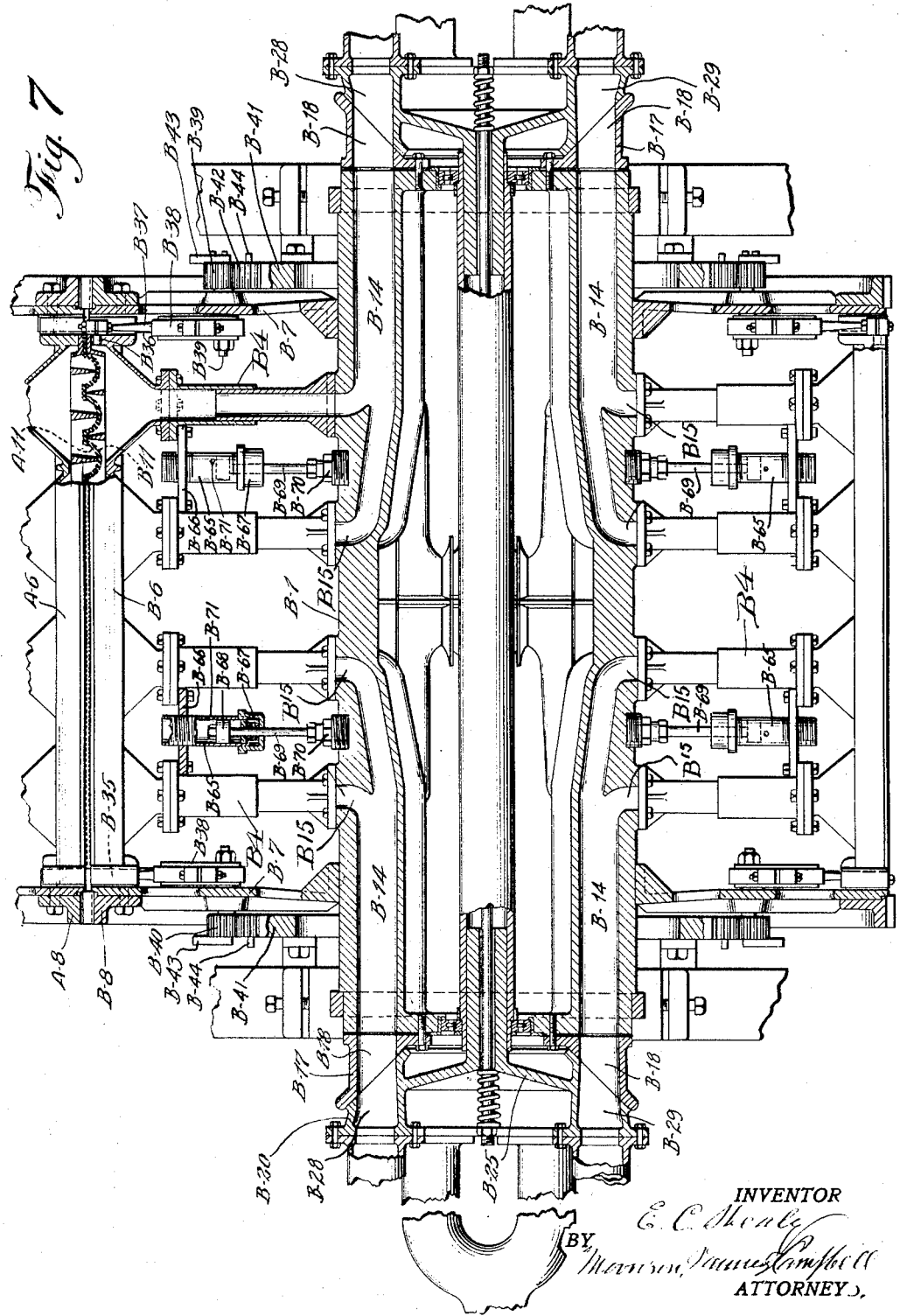

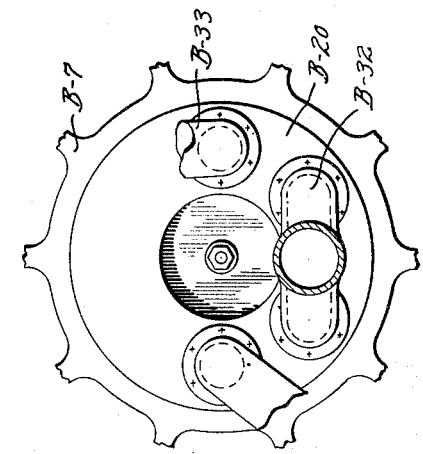
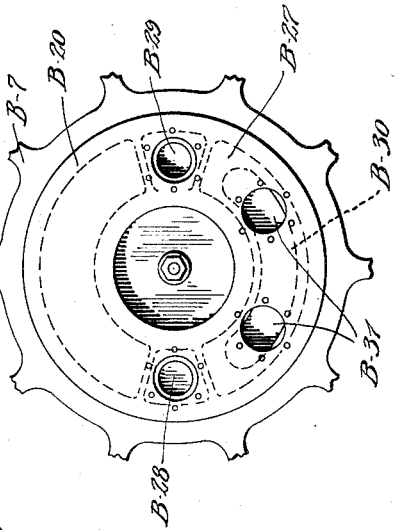
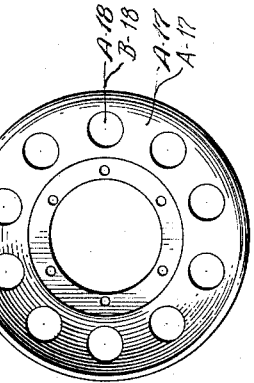
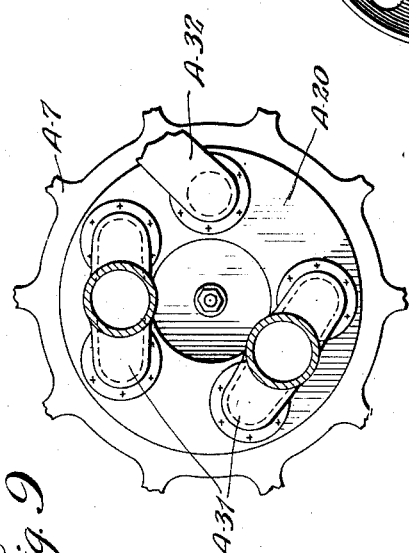
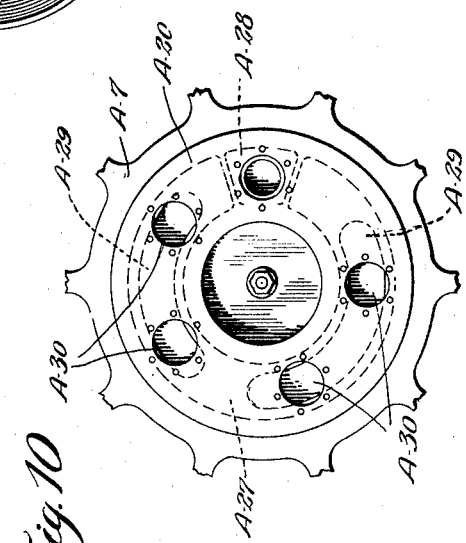

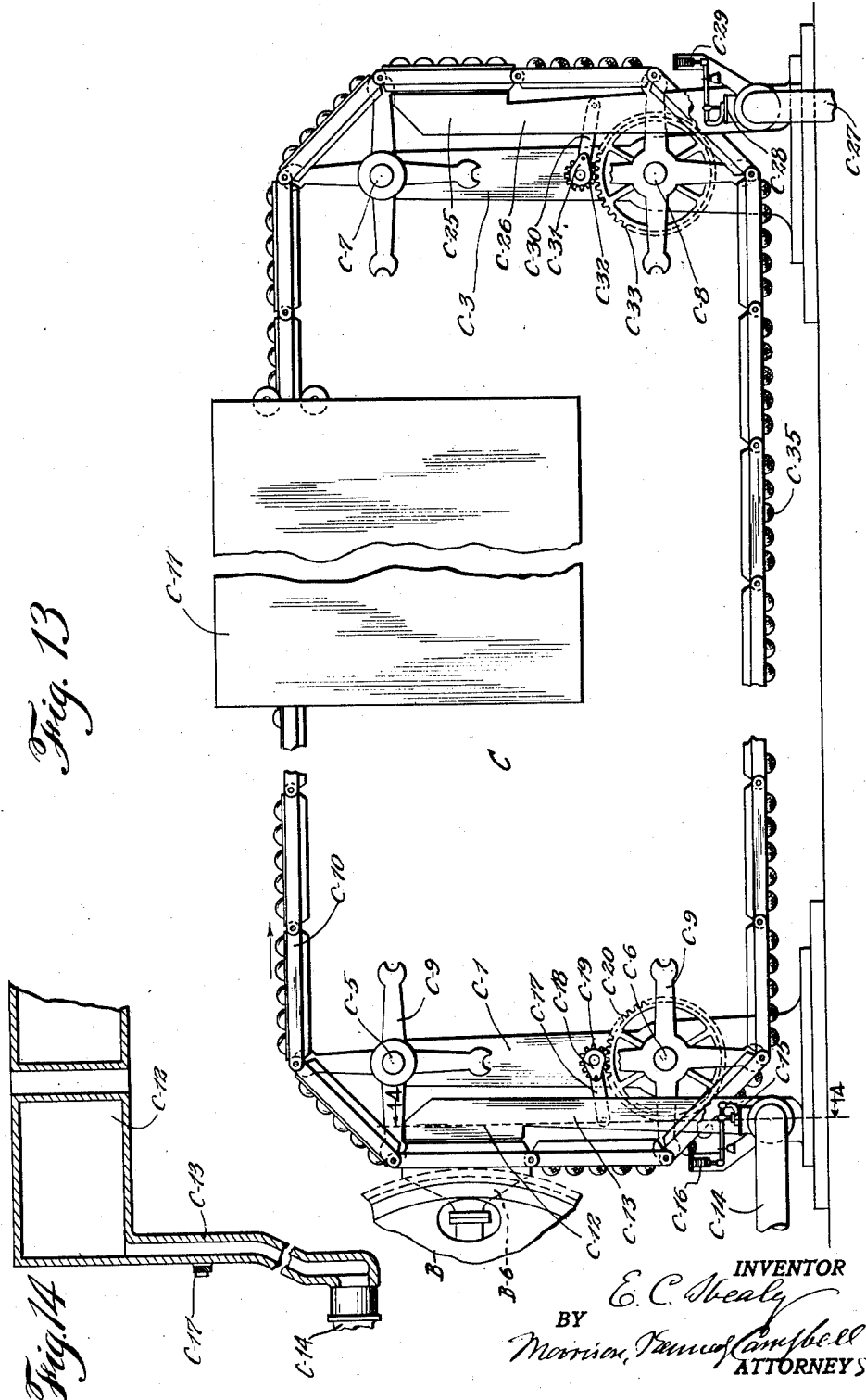

1,967,361

UNITED STATES PATENT OFFICE 1,967,361

PULP MOLDING MACHINE

Ellis C. Healy, East Orange, N. J., assignor, by mesne assignments, to Holed-Tite Packing Corporation, New York, N. Y., a corporation of New York Application March 16, 1929, Serial No. 347,507

42 Claims. (Cl. 92—56)

This invention relates to improvements in apparatus for producing articles from pulp, and refers particularly to machinery for automatically producing cell boards or egg case fillers.

An important object of the invention is to provide a machine which will produce articles of the above mentioned character from pulp, more mechanically perfect flats of a greater variety of shapes, and deliver the finished products in continuous operations more expeditiously than has been possible with prior art machines.

More specifically the invention contemplates an apparatus comprising a tank to contain the pulp in suspension, a pair of cooperating mold units rotatably mounted, and mechanism for drying and delivering the finished articles. Each of the mold units includes a series of circumferentially spaced perforated molds, those of one unit being complementary to those of the other, and the molds of one unit being adapted successively to dip into the tank to withdraw a quantity of pulp therefrom. The adhesion of the pulp to the mold is augmented by a suction action at the inner side thereof, causing the withdrawn pulp to take the shape of the mold and at the same time drawing some of the moisture out of it. As this forming mold unit continues to rotate, its molds are successively brought into line with those of the second mold unit, the latter being at that time moved radially outward on their carrier, whereupon the pulp articles are pneumatically transferred to the molds of the second rotary unit. These transfer molds carry the article through substantially half a revolution, during which time they are also held to the molds by suction, and at the end of such movement they are transferred to an endless conveyor which carries them through a baking oven.

In addition to the suction arrangements above referred to, the invention contemplates the use of air blasts at definite intervals to assist in transferring the pulp articles from the forming molds to the transfer molds, and from the latter to the conveyor. Suitable mechanism is provided to control these suctions and blasts and to have them properly synchronized throughout the cycles of operation.

The apparatus is preferably driven by a single electric motor through suitable gearing, and production by the machine is carried out rapidly and entirely automatically.

The foregoing and other objects, features and advantages of the invention will readily appear from the following description in connection with the accompanying drawings, wherein one form of the invention has been shown by way of illustration, and wherein—

Figure 1 is a side elevation of the improved machine, showing the relation of the several units;

Fig. 2 is a top plan view thereof;

Fig. 3 is an elevation of the mold carrying units on an enlarged scale;

Fig. 4 is a vertical transverse sectional view through the initial forming mold carrier;

Fig. 5 is a similar view through the transfer mold carrier;

Fig. 6 is a horizontal sectional view through the forming mold carrier of Fig. 4;

Fig. 7 is a similar view through the transfer mold carrier of Fig. 5;

Fig. 8 is a detail elevation of one of the rotatable manifold seats;

Fig. 9 is a fragmentary sectional end view of the stationary manifold at one end of the forming mold unit;

Fig. 10 is a similar view with the pipe fittings removed;

Fig. 11 is a fragmentary sectional end view of the stationary manifold at one end of the transfer mold unit;

Fig. 12 is a view similar to Fig. 11 with the pipe fittings removed;

Fig. 13 is a side elevation of the conveyor used in the final step of drying and baking the pulp article; and Fig. 14 is a fragmentary vertical sectional view on the line 14—14 of Fig. 13.

Referring now to the drawings in detail, and particularly to Figs. 1 and 2, it will be seen that the improved apparatus comprises a forming mold unit A, a transfer mold unit B, and an endless conveyor mechanism C, all cooperating in the production of pulp articles in a continuous operation. These articles are initially formed unit A, then transferred to the unit B, and subsequently to the conveyor C by which they are carried through a drying oven and later discharged at a suitable point of delivery. The transferring of the pulp articles from one unit to another, and the initial formation and final discharge thereof, are effected by a pneumatic system in which successive suctions and blasts act through the molds and on the pulp articles, as will hereinafter be explained.

The pulp 1 is held in suspension as usual in a tank 2, above which the forming mold unit A is rotatably mounted, so as to dip down therein.

This mold unit is illustrated in detail in Figs. 4 and 6, and comprises a substantially hollow central drum portion A—1, having its opposite ends journalled as at A—2 and A—3 in fixed supports, and carrying a plurality of radially extending hollow arms A—4 formed of piping. In the illustrated embodiment there are four such arms A—4 in each radial series, but obviously their number may be varied to suit the production requirements of individual machines. The outer ends of the arms A—4 of each series are connected to throat portions A—5 of a longitudinally extending mold box A—6 which also is hollow and open on its outer side or peripheral face. In addition to being secured to the tubular arms A—4, these boxes A—6 are fastened at their opposite ends to annular plates A—7 which in turn are bolted as at A—7×, or otherwise secured to the drum portion A—1 of the unit adjacent the ends thereof. Secured to or integral with said plates A—7, at their outer peripheral edges, are ring gears A—8, by means of which the unit is rotated. Disposed in each box A—6 and secured thereto as by screws A—9, is a cast metal grill A—10, the longitudinal and transverse ribs of which have an undulating contour and are covered with a mold facing A—11. This mold facing may be constructed of closely woven wire mesh as illustrated, or of a foraminous sheet metal plate, and is formed to the shape which it is desired to impart to the pulp articles.

Extending longitudinally inward from the opposite ends of the drum portion A—1 are a plurality of separate fluid passages or ports A—14, which communicate with the tubular arms A—4 through off-set branches A—15. Secured to the opposite ends of the drum portion A—1, as by screws or bolts A—16, are ring members A—17 which have circular series of ports A—18 in line with the passages A—14, and having their outer faces A—19 formed as conical seats for the reception of non-rotatable manifold or valve members A—20. These valve members A—20 include central stem portions A—21 which extend inwardly into the adjacent ends of the drum A—1 within the extremities of a central longitudinal tube A—22, which is mounted in the drum by means of anti-friction bearings A—23. The stem portions A—21 are centrally bored for the mounting of a rod A—24, the opposite ends of which extend outwardly beyond central web portions A—25 of the valve members A—20, and are provided with compression springs A—26 acting to draw said valve members toward each other and thus to hold them tightly against their seats A—19.

As best shown in Fig. 10, each manifold or valve member A—20 is internally formed with two separate compartments, one of which, designated by the reference character A—27, is a suction chamber, and the other, A—28, is a pressure chamber. The suction chamber A—27 is of much greater arcuate extent than the pressure chamber A—28, and is adapted to constantly communicate with all but one of the ports A—18 through slots A—29 in the inner face of the valve member. Through openings A—30 in the outer face of the valve member, this suction chamber A—27 is connected with a vacuum pump or the like (not shown) which acts upon the chamber through the piping A—31. The pressure chamber A—28, on the other hand, communicates with only one of the ports A—18, furnishing blasts of air under pressure therethrough by virtue of its connection by piping A—32 to a suitable source of air pressure. The flow of air through the pressure chamber A—28 is not continuous, but is automatically rendered intermittent by the medium of a valve A—33 which is actuated by a solenoid A—34.

From the foregoing it will be clear that, as the drum portion A—1 and its associated parts are caused to rotate in the direction indicated in Fig. 3, the molds will successively dip into and travel through the pulp in tank 2. At this time the interiors of the molds are under the influence of the suction action through the ports A—18, A—14, A—15 and tubular arms A—4, causing a layer of pulp fibers to adhere to the mold facings A—11. This suction action is maintained on each mold until it reaches a position wherein the corresponding ports A—18, A—14 pass beyond the end of the arcuate slot A—29, and during that time the pulp becomes initially shaped to correspond with the mold facing, and some of the moisture is drawn out of it. The pulp is thus carried around until the corresponding ports A—18, A—14 come in line with the pressure chamber A—28, at which time the solenoid A—34 opens valve A—33, admitting a blast of air to said chamber to blow the pulp article from the mold facing A—11. This action transfers the pulp article to a mold of the unit B which will now be described.

With the exception of the differences hereinafter noted, the unit B is constructed like the unit A. Thus a central drum portion B—1, identical with the drum A—1 is mounted for rotation on an axis parallel with that of the first described unit, and carries the spaced annular plates B—7 and radial arms B—4. It is to be noted however that the arms B—4 are made of telescoping sections, and that the mold boxes B—6 on the outer ends of the arms B—4 are slidable radially on guides B—35 (Fig. 5) on the inner sides of the plates B—7. The opposite ends of the mold boxes B—6 are pivotally connected at B—36 to eccentric connecting rods B—37, which in turn are caused to reciprocate by virtue of their association with eccentrics B—38 on the inner ends of shafts B—39. These shafts B—39 extend through the plates B—7 and correspond in number and spacing with the arms B—4, and they carry at their outer ends, segmental pinions B—40, by means of which the eccentrics are actuated.

As best shown in Fig. 3, each of these pinions B—40 is cut away on one side to a concave curvature which corresponds with the periphery of a ring B—41 held in fixed position adjacent to the plate B—7 at each end of the unit. At diametrically opposite points on the horizontal axis, each of the rings B—41 is cut away and fitted with rack blocks B—42, the teeth of which rise on an incline from the periphery of the rings and impart rotary movement to the pinions B—40, as the latter are carried over the blocks. By virtue of the eccentricity of the pinion B—40 and the inclination of the toothed faces of the rack blocks B—42, the connecting rods B—37 will be given a variable motion which, on the outward stroke, accelerates, and on the inward stroke, decelerates. In other words, the speed of movement imparted to the mold boxes B—6 is greatest at the end of their outward strokes and at the beginning of their inward strokes. This action prevents interference between and binding of the forming and transferring molds as they approach and leave the transfer station.

In order to throw the teeth of the pinions

B—40 into mesh with the rack blocks B—42, each of the shafts B—39 carries a trip finger B—43 which extends radially inward over the annular face of the corresponding ring B—41 when the pinion is sliding over the periphery of the ring. Disposed in the path of movement of these trip fingers B—43, at the near end of each rack block, is a pin B—44, which, when engaged by the successive trip fingers B—43, causes the shafts B—39 to rotate on their own axes, which rotation is continued until the teeth become disengaged. As each pinion thus passes the rack bar, this planetary motion, acting through the eccentric B—38 and rod B—37, moves the corresponding mold box B—6 radially outward and again inward with reference to the plates B—7. The extreme outward limit of such movement is reached when the tubular arm B—4 is in horizontal position, at which time the pulp article is transferred, as before explained, from the forming mold to the transfer mold.

In order to overcome any likelihood of injury due to reversal of stresses in the eccentric connecting rods B—37, cushioning means are associated with the telescoping arms B—4, as shown in Fig. 7. Such cushioning means comprise cylinders B—65 disposed between the sliding members of adjacent arms B—4, and secured thereto by cross-bars B—66. The outer ends of these cylinders are open, while their inner ends are closed by packing heads B—67. Disposed within each cylinder is a piston or plunger B—68, rigidly held by a rod B—69, the inner end of which is anchored as at B—70 on the drum B—1, said rod extending through the corresponding packing head B—67. Thus it will be evident that, as the mold boxes B—6 are reciprocated as above explained, the cylinders B—65 will be carried with them and moved axially with reference to their pistons B—68. On the outward stroke of the cylinder, the air between the piston and the packing head will be compressed, whereas on the return stroke the air so compressed will, by expanding, assist in the reversal of direction. Intermediate its ends, each cylinder B—65 is provided with a vent or port B—71 which passes the piston on each stroke and properly maintains the normal supply of air in each cylinder. The cylinders and their associated pistons constitute in effect, dash-pots for cushioning the movements of the mold boxes B—6 at the outer limits of their movement, and thereby relieve the rods B—37 of sudden reversal of stresses.

As the pulp articles are thus transferred to the molds of the unit B, they are drawn to and held in place against the mold facings B—11 with which the molds are provided, by a suction which acts through the telescopic arms B—4. Like the member A—1, the drum portion B—1 is formed with a plurality of longitudinally extending ports B—14, and has secured to its opposite ends the ring members B—17 which are apertured at B—18 to correspond with the ports B—14. The ring members B—17 are identical in construction with the previously described ring members A—17, and are fitted with manifolds or valve members B—20 which are yieldingly held to their seats and prevented from rotation. These valve members B—20, as best shown in Figs. 11 and 12, are provided at diametrically opposite points with a suction chamber B—28 and an air blast chamber B—29, between which, at the lower side of the horizontal axis, is another suction chamber B—27. The suction through the chamber B—28 is not continuously maintained, but is rendered intermittent by the action of a normally closed valve B—60 which is periodically opened by a solenoid B—61, energized by one of the commutators at R. Thus, at the same time that the solenoid A—34 acts, as previously explained, to open its valve to permit a transferring blast through the mold A—6 which is at the transferring position, the solenoid B—61 will open the valve B—60 to effect the suction action through the mold B—6, augmenting the dislodging action of the blast and thereafter positively holding the transferred article. The suction chamber B—27 is adapted to communicate with certain of the openings or ports B—18 through an arcuate slot B—30, and to be connected through apertures B—31 with suitable piping B—32, which is preferably connected to the same source as the piping A—31. Thus it will be clear that, as the mold unit B continues to rotate, the pulp articles which are successively transferred to its mold faces B—11, are carried around through substantially half of a revolution until their corresponding ports B—18 come into alinement with the blast chamber B—29, at which time said pulp articles are blown out of the transfer molds of the unit B and received within suitable sections of a conveyor mechanism C. Intermittent blasts of air through the chamber B—29 are similarly controlled by a valve B—62 actuated by solenoid B—63, which is also controlled by one of the commutators at R, similar to the actuation of the solenoid A—34.

The annular plates B—7 are also provided at their outer sides with ring gears B—8 which mesh with the ring gears A—8, whereby the two mold carriers will at all times, rotate in unison but in opposite directions. Such rotary motion is transmitted to the ring gears B—8 by means of a pinion B—50 on a shaft B—51 (Figs. 2 and 3), said shaft being driven through worm gearing B—52 and speed reduction gears B—53, from a motor or other prime mover B—54. The shaft B—51 also carries a driving pinion B—55 which meshes with a gear B—66 for the purpose of transmitting power to the conveyor mechanism C, which is best shown in Figs. 13 and 14.

In constructing this conveyor, four pedestals C—1, C—2, C—3, and C—4 are arranged in spaced relation, as shown in Fig. 2, and in such a manner as to constitute supports for transverse shafts C—5, C—6, C—7 and C—8. Adjacent the pedestals, each of these shafts carries a pair of sprocket members C—9, over which an endless conveyor chain C—10 is adapted to travel. The conveyor chain C—10 is composed of a plurality of sections hingedly connected together, each of said sections being of such a size as to be capable of receiving one of the formed pulp articles from a mold of the transfer unit B, and to carry the same through a suitable drying oven C—11, in which all of the remaining moisture is removed from the pulp.

A suction head C—12 extends transversely within the conveyor chain C—10 and adjacent to the delivery side of the mold unit B, said suction head being supported at its opposite ends on pivoted arms C—13 which are hollow and adapted for connection with the exhaust manifold A—31 by means of a pipe C—14. The passage of air through the suction head is controlled intermittently by a valve C—15 under the inuflence of a solenoid C—16, which in turn is automatically actuated by one of the commutator rings at R. The pivoted arms C—13 which support the suction head C—12 are given an oscillating movement by means of links C—17, which are connected with small cranks C—18, rotatable with pinions C—19 driven by gears C—20 on the shaft C—6. This oscillating movement allows clearance for the successive positioning of the sections of the conveyor chain C—10 at the transfer point.

At the oposite end of the conveyor C, is a pressure head C—25, which like the suction head C—12 is mounted upon pivoted arms C—26 which are hollow and connected with an air supply pipe C—27, through which blasts of air are directly blown under the control of a valve C—28, actuated by a solenoid C—29. The pivoted arms C—26 are oscillated in the same manner as the arms C—13 by links C—30 and cranks C—31, the latter being rotated by pinions C—32 meshing with gears C—33 on the shaft C—8.

The arrangement is such that, after the pulp articles have been carried through the drying oven or chamber C—11, they will be successively brought into line with the open face of the pressure head C—25, at which time a blast of air from pipe C—27 will be blown through said pressure head, causing the finished pulp article to be removed from the conveyor chain C—10 and caught in any suitable type of tray or container provided for the purpose.

The individual sections of the conveyor chain C—10 are also provided with a perforated facing members C—35, the surfaces of which correspond with the shape of the pulp article and which therefore are complementary to the mold facings B—11.

In the drawings a number of commutator members have been indicated diagrammatically at R for the purpose of controlling the various solenoids which effect the transferring operations. Such commutators however, have not been shown in detail, because they do not in themselves constitute a part of the present invention; and may be made of any one of a number of well known forms.

It is believed that the operation of the machine will be entirely clear from the foregoing description and therefore only brief recapitulation will be given. With the parts in the positions shown, power will be supplied to rotate the motor B—54, and thus through the gearing to rotate the mold carriers A and B and the conveyor mechanism C. As the mold carrier A rotates in the direction of the arrow shown in Fig. 3, its molds will successively dip into the pulp in the tank 2 and will withdraw onto the mold facings, a supply thereof, carrying the same around to a position in which the formed articles are transferred to the molds of the unit B. At that time, as has previously been explained, a blast of air will be supplied through the tubular arm A—4, while the opposite side of the pulp article will be drawn into the transfer mold by a suction through the corresponding arm B—4. From this position the pulp article will be carried around to the opposite side of the axis of the unit B where a similar blast on one side and suction on the other, will transfer it to one of the sections of the conveyor chain C—10. The operation is entirely continuous and the co-action of the parts is such as to render the apparatus capable of rapid production.

Having thus described my invention, what I claim is:—

1. Apparatus for forming articles from pulp comprising a tank to contain the pulp, a forming mold adapted to dip periodically into said tank to withdraw a quantity of pulp therefrom, a traveling carrier for said mold, a transfer mold complementary to the first and adapted to cooperate therewith and to receive the formed pulp article therefrom at a definite point in the path of movement thereof, a traveling carrier for said transfer mold, and means for moving the transfer mold with reference to its carrier in the transfer of the pulp articles.

2. Apparatus for forming articles from pulp comprising a tank to contain the pulp, a forming mold adapted to dip periodically into said tank to withdraw a quantity of pulp therefrom, a rotatable carrier for said mold, a transfer mold complementary to the first and adapted to cooperate therewith in receiving the formed pulp article therefrom at a definite point in the path of movement thereof, a rotatable carrier for said transfer mold, means for moving the transfer mold radially with reference to its carrier, and automatically controlled means for pneumatically effecting the transfer of the pulp article from the forming mold to the transfer mold.

3. In apparatus for forming articles from pulp, a tank to contain the pulp, a set of forming molds rotatably mounted to dip successively into said tank to withdraw quantities of pulp therefrom, suction means acting on the molds to facilitate such withdrawal of the pulp, a set of transfer molds rotatable in opposition to the forming molds and complementary thereto, means for moving each of said transfer molds radially when it is in line with a corresponding forming mold, suction means also acting upon said transfer molds, and means for intermittently replacing the suction in the forming molds by fluid pressure at predetermined intervals to assist in the transfer of the pulp articles from the molds.

4. In apparatus for producing articles from pulp, a mold unit comprising a central drum portion having a plurality of separate longitudinally extending fluid passages, means for rotating said drum portion, a plurality of perforated molds spaced around the periphery of said drum portion and having fluid connections with said passages at different points in the length of the drum, and a manifold member yieldingly seated against the end of the drum portion and held against rotation, said manifold having pipe connections adapted for communication with said fluid passages during certain portions of the rotation of the drum.

5. In apparatus for producing articles from pulp, a pair of rotatable carriers, forming molds and transfer molds associated respectively with said carriers around their peripheries, a tank to contain pulp into which the forming molds are adapted to dip, means for rotating the carriers in opposite directions, and means for successively moving the transfer molds individually toward the forming molds as they come respectively into juxtaposition.

6. In apparatus for producing articles from pulp, a pair of rotatable carriers, forming molds and transfer molds arranged around the peripheries of said carriers respectively, those of one carrier being complementary to those of the other, a tank to contain pulp into which the forming molds are adapted to dip, means for rotating the carriers in opposite directions, means for successively and individually moving the transfer molds toward the forming molds as they come respectively into juxtaposition, and suction means acting on said molds during definite portions of their movement.

7. In apparatus for producing articles from pulp, a pair of rotatable carriers, forming molds and transfer molds arranged around the peripheries of said carriers respectively, those of one carrier being complementary to those of the other, a tank to contain pulp into which the forming molds are adapted to dip, means for rotating the carriers in opposite directions, means for successively moving the individual transfer molds toward the forming molds as they come respectively into juxtaposition, and fluid pressure means for transferring formed pulp articles from the forming molds to the others as they reach positions of closest proximity.

8. In apparatus for producing articles from pulp, a pair of rotatable carriers, forming molds and transfer molds arranged around the peripheries of said carriers respectively, those of one carrier being complementary to those of the other, means for rotating the carriers in opposite directions, a tank to contain pulp into which the forming molds are adapted to dip, means for successively moving the transfer molds individually toward the forming molds as they come respectively into juxtaposition, and fluid pressure means acting on the forming molds to draw a supply of pulp thereon from the tank, form the same to the shape of the molds, and transfer the formed pulp to the transfer molds.

9. In or for apparatus of the class described, a mold carrier unit comprising a rotatable drum member having a plurality of radial arms formed of telescoping sections, outwardly facing transfer mold members on the outer ends of said radial arms, adapted to receive molded articles from forming molds, and means for automatically moving the mold members successively toward and from the axis of the drum member during a portion of the rotation thereof to cooperate with the forming molds in effecting the transfer of the molded article.

10. In or for apparatus of the class described, a mold carrier unit comprising a rotatable drum member having a plurality of radial arms formed of telescoping sections, outwardly facing mold members on the outer ends of said radial arms, means including eccentrics for reciprocating the mold members radially with reference to the drum member, and means for successively and intermittently actuating said eccentrics.

11. In or for apparatus of the class described, a mold carrier unit comprising a rotatably drum member, a pair of spaced annular plates connected to said drum member, a plurality of arms extending radially from the drum member and formed of telescoping sections, outwardly facing molds extending longitudinally between said plates and secured to the outer ends of said radial arms, means bodily rotatable with said annular plates to reciprocate the molds radially with reference to the axis of the drum member, and stationary means for periodically actuating the reciprocating means, whereby to advance and retract the molds as they arrive successively at definite points in their path of rotation.

12. In or for apparatus of the class described, a mold carrier unit comprising a rotatable drum member, a pair of spaced annular plates connected to said drum member, a plurality of arms extending radially from the drum member and formed of telescoping sections, outwardly facing molds extending longitudinally between said plates and secured to the outer ends of said radial arms, eccentrics carried by said annular plates and connected with the molds, and means for successively operating the eccentrics intermittently to advance and retract the molds as they arrive at a definite point in their path of rotation.

13. In or for apparatus of the class described, a mold carrier unit comprising a rotatable drum member, a pair of spaced annular plates connected to said drum member, a plurality of arms extending radially from the drum member and formed of telescoping sections, outwardly facing molds extending longitudinally between said plates and secured to the outer ends of said radial arms, eccentrics carried by said annular plates and connected with the molds, and segmental planetary gears operable to actuate the eccentrics intermittently and successively, whereby to advance and retract the molds as they arrive at a definite point in their path of rotation.

14. In or for apparatus of the class described, a mold carrier unit comprising a rotatable drum member, a pair of spaced annular plates connected to said drum member, a plurality of arms extending radially from the drum member and formed of telescoping sections, outwardly facing molds extending longitudinally between said plates and secured to the outer ends of said radial arms, eccentrics carried by said annular plates and connected with the molds to reciprocate the same, ring members mounted in fixed position adjacent the outer sides of the annular plates, said ring members having at points in their periphery rack blocks, segmental gears associated with said eccentrics and adapted for sliding engagement with said ring members and for meshing with said rack blocks to rotate the eccentrics, and trip means bringing said gears into mesh with the rack blocks.

15. In or for apparatus of the class described, a traveling mold carrier having a plurality of outwardly facing mold members, and means for successively moving said mold members away from and toward the path of movement of the carrier with accelerating and decelerating motions respectively during the movement thereof.

16. In or for apparatus of the class described, a mold carrier unit comprising a rotatable drum member having a plurality of outwardly facing mold members carried by the drum and mounted for movement radially with reference to the drum member, and means for successively moving said mold members away from and toward the axis of the drum member with accelerating and decelerating motions respectively during a portion of the rotation of the drum.

17. In or for apparatus of the class described, a mold carrier unit comprising a rotatable drum member having a plurality of radial arms formed of telescoping sections, outwardly facing mold members on the outer ends of said radial arms, means for reciprocating the mold members radially with reference to the drum member, and means for successively and intermittently actuating said reciprocating means with accelerating and decelerating motion.

18. In or for apparatus of the class described, a mold carrier unit comprising a rotatable drum member, a pair of spaced annular plates connected to said drum member, a plurality of arms extending radially from the drum member and formed of telescoping sections, outwardly facing molds extending longitudinally between said plates and secured to the outer ends of said radial arms, connecting rods carried by said annular plates and connected with the molds, and means for successively operating the connecting rods intermittently to advance the molds with an accelerating motion as they arrive at a definite point in their path of rotation, and subsequently to retract the molds with a decelerating motion.

19. In or for apparatus of the class described, a mold carrier unit comprising a rotatable drum member having a plurality of outwardly facing mold members carried by the drum and mounted for movement radially with reference to the drum member, means for successively moving said mold members away from and toward the axis of the drum member with accelerating and decelerating motions respectively during a portion of the rotation of the drum, and means for cushioning the outward radial movements of the mold members.

20. In or for apparatus of the class described, a mold carrier unit comprising a rotatable drum member having a plurality of radial arms formed of telescoping sections, outwardly facing mold members on the outer ends of said radial arms, means for reciprocating the mold members radially with reference to the drum member, means for successively and intermittently actuating said reciprocating means with accelerating and decelerating motion, and means including dashpots connected wtih the radial arms and with the drum member whereby to relieve the reciprocating means of sudden reversing stresses.

21. In apparatus for forming articles from pulp, a tank to contain the pulp, a set of forming molds rotatably mounted to dip successively into said tank to withdraw quantities of pulp therefrom, suction means acting on the molds to facilitate such withdrawals of the pulp, a set of transfer molds rotatable in opposition to the forming molds and complementary thereto, means for moving each of said transfer molds radially when it is in line with a corresponding forming mold, electrically controlled means for supplying a blast of air through the forming mold when it is in such position with reference to the transfer mold, and electrically controlled means for simultaneously creating a suction in the transfer mold, the suction on one side and pressure on the other resulting in the transfer of the pulp article from one mold to the other.

22. In apparatus for forming articles from pulp, a tank to contain the pulp, a forming mold adapted to dip periodically into said tank to withdraw a quantity of pulp therefrom, a traveling carrier for said mold, a transfer mold complementary to the forming mold and adapted to cooperate therewith and to receive the formed pulp article therefrom at a definite point in the path of movement thereof, a traveling carrier for said transfer mold, means for moving the transfer mold independently toward the forming mold, electrically controlled means for supplying a blast of air through the forming mold when it is in such position with reference to the transfer mold, and electrically controlled means for simultaneously creating a suction in the transfer mold, the suction on one side and the pressure on the other side resulting in the transfer of the pulp article from one mold to the other.

23. In an apparatus for producing articles from pulp, the combination of a movable carrier, hollow perforate forming molds thereon, a second movable carrier, hollow perforate transfer molds thereon adapted to be positioned in succession in operative relation to the respective forming molds to receive the molded articles, means for moving the transfer molds individually and in relation to their carrier toward the forming molds in the successive positioning of the transfer molds, pneumatic mechanism, and controlling means for said mechanism operative to create suction in the forming molds to deposit the pulp thereon, and then to create pressure in the positioned forming mold simultaneously with the creation of suction in the associated transfer mold to effect the transfer of the article to the transfer mold.

24. In an apparatus for producing articles from pulp, the combination of a movable carrier, hollow perforate forming molds thereon, a second movable carrier, hollow perforate transferring molds thereon adapted to be positioned in succession in operative relation to the respective forming molds to receive the molded articles, means for moving the transfer molds individually and in relation to their carrier towards the forming molds in the successive positioning of the transfer molds, pneumatic mechanism, and controlling means for said mechanism operative to create suction in the forming molds to deposit the pulp thereon, then to create pressure in the positioned forming mold simultaneously with the creation of suction in the associated transfer mold to effect the transfer of the article to the transfer mold, and finally to create pressure in said transfer mold to discharge the article therefrom.

25. In an apparatus for producing articles from pulp, the combination of a movable carrier, hollow perforate transfer molds thereon adapted to receive molded articles from forming molds, and a conveyor traveling in proximity to the path of travel of the transfer molds and formed of connected perforate sections, mechanism for successively positioning the transfer molds relative to the successive sections of the conveyor to permit of the transfer of the articles to the conveyor, a hollow suction head located at said transfer point, pneumatic mechanism, and controlling means therefor operative to create a pressure in the positioned transfer mold and simultaneously to create suction in the suction head and through the positioned section of the conveyor, thereby to cause the transfer of the article to the conveyor.

26. In an apparatus for producing articles from pulp, the combination of a movable carrier, hollow perforate transfer molds thereon adapted to receive molded articles from forming molds, a conveyor traveling in proximity to the path of travel of the transfer molds and formed of connected perforate sections, mechanism for successively positioning the transfer molds relative to the successive sections of the conveyor to permit of the transfer of the articles to the conveyor, a hollow suction head located at said transfer point, a hollow pressure head associated with the conveyor at a point removed from the suction head, pneumatic mechanism, and controlling means therefor operative to create pressure in the positioned transfer mold and simultaneously to create suction in the suction head to cause the transfer of the article to the conveyor, and finally to create pressure in the pressure head to discharge the article from the conveyor.

27. In apparatus for producing articles from pulp, the combination of a movable conveyor formed of connected perforate sections adapted to receive molded articles from molds, a hollow suction head associated with said conveyor, and in relation to which the sections of the conveyor are successively positioned, and means for creating suction in said head and through the positioned conveyor section to aid in the transfer of the article from the mold to the conveyor.

28. In apparatus for producing articles from pulp, the combination of a movable conveyor formed of connected perforate sections adapted to receive molded articles from molds, a hollow pressure head associated with said conveyor, and in relation to which the sections of the conveyor are successively positioned for the discharge of the articles therefrom, and means for creating pressure in said head and through the positioned conveyor section to effect the discharge of the article.

29. In apparatus for producing articles from pulp, the combination of a movable mold carrier and hollow perforate molds thereon adapted to hold molded articles, a traveling conveyor formed of connected perforate sections, mechanism for successively positioning the molds relative to the front faces of the successive sections of the conveyor to permit of the transfer of the articles thereto from the molds, a hollow suction head in position to act at the rear face of the positioned conveyor section, said suction head being movable away from the positioned section to provide clearance for the positioning of the same, and means for creating suction through said head and through the positioned conveyor section.

30. In apparatus for producing articles from pulp, the combination of a movable mold carrier and hollow perforate molds thereon adapted to hold molded articles, an endless chain conveyor to receive the articles from the carrier, said conveyor being composed of connected perforate sections, means for controlling the movements of the mold carrier and conveyor chain to position the outer faces of the conveyor sections successively in operative relation to the successive molds to receive the molded articles therefrom, a hollow suction head extending transversely within the chain at one end to act at the rear side of the positioned sections, means for creating suction therethrough and through the positioned section, a hollow pressure head extending transversely within the chain at the opposite end thereof to act at the rear side of the perforate sections in succession, and means for creating pressure in said head and through the section for the time being in operative relation thereto, to discharge the article therefrom.

31. In or for apparatus of the class described, a mold carrier unit comprising a rotatable drum member having a plurality of outwardly facing mold members carried by the drum and mounted for movement radially with reference thereto, means for successively moving said mold members to and from the axis of the drum member, and means for cushioning the outward radial movements of the mold members.

32. In or for apparatus of the class described, a mold carrier unit comprising a rotatable drum member having a plurality of radial arms formed of telescoping sections, outwardly facing mold members on the outer ends of said radial arms, means for reciprocating the mold members radially with reference to the drum member, and means including dash pots connected with the radial arms and with the drum member, whereby to relieve the reciprocating means of sudden reversing stresses.

33. A pulp molding machine comprising a rotary forming carrier carrying a series of forming molds, a rotary receiving carrier carrying a series of receiving molds, means for rotating said carriers in opposite directions to cause the respective forming and receiving molds, in pairs, to approach each other when alined with the carrier axes, mechanism coacting with the molds on one carrier for sliding each individual mold radially outwardly and inwardly on such carrier to cause close juxtaposition of each mold-pair at the moment of their alinement with the carrier axes, and pneumatic means for causing each molded article to be transferred from the forming mold to the receiving mold at such moment of alinement.

34. A pulp molding machine comprising a rotary forming carrier carrying a series of forming molds, a rotary transfer carrier carrying a series of transfer molds, means for rotating said carriers to cause the respective forming and transfer molds, in pairs, to approach each other when alined with the carrier axes, mechanism coacting with the molds on one carrier for shifting each individual mold outwardly and inwardly on such carrier to cause close juxtaposition of each mold-pair at the moment of their alinement with the carrier axes, and pneumatic means for causing each molded article to be transferred from the forming mold to the transfer mold at such moment of alinement.

35. A machine for forming pulp article comprising a forming carrier carrying a succession of forming molds, around an orbit, a receiving carrier carrying a succession of receiving molds around an orbit adjacent to the first orbit, means for actuating said carriers to cause the respective forming and receiving molds, in pairs, to approach each other for the transfer operation, mechanism coacting with the molds on one carrier for shifting each individual mold outwardly and inwardly on such carrier to cause close juxtaposition of each mold-pair at the time of transfer, and pneumatic means for causing each molded article to be transferred from the forming mold to the receiving mold while in close juxtaposition.

36. A machine as in claim 35 and wherein is means supplying pulp to the molds on the forming carrier, and the molds on the receiving carrier are movable outwardly and inwardly for the transfer of articles thereto.

37. A machine as in claim 34 and wherein the pneumatic means comprises a telescopic air connection for each of said outwardly and inwardly movable molds.

38. A machine as in claim 34 and wherein the mechanism for moving each mold outwardly and inwardly comprises a mechanical device operating by reason of the advance of each mold.

39. A machine as in claim 33 and wherein the mold sliding mechanism comprises an eccentric, a strap and rod from the eccentric to the mold delivering crosshead motion to the mold, and means for rotating the eccentric in time with the advance of the mold.

40. A machine as in claim 33 and wherein the mold sliding mechanism comprises an eccentric, a strap and rod from the eccentric to the mold delivering crosshead motion to the mold, and means for rotating the eccentric in time with the advance of the mold, comprising a pinion on the eccentric, and a fixed rack operating the pinion.

41. A machine as in claim 33 and wherein the mold sliding mechanism comprises an eccentric, a strap and rod from the eccentric to the mold delivering crosshead motion to the mold, and means for rotating the eccentric in time with the advance of the mold, comprising an eccentric pinion for turning the eccentric, and a rack shaped to rotate the pinion and eccentric, whereby the mold movement is accelerated outwardly and decelerated inwardly.

42. A machine as in claim 33 and wherein the mold sliding mechanism comprises an eccentric, a strap and rod from the eccentric to the mold delivering crosshead motion to the mold, and means for rotating the eccentric in time with the advance of the mold, comprising a mutilated pinion for turning the eccentric and means including a rack for rotating the pinion for sliding the mold and for locking the pinion at other times.

ELLIS C. HEALY.